(12) United States Patent
Ostman

(10) Patent No.: US 6,763,935 B2
(45) Date of Patent: Jul. 20, 2004

(54) PIVOTABLE CONVEYOR SKIRT BOARD ASSEMBLY

(75) Inventor: Arthur C. Ostman, Mount Iron, MN (US)

(73) Assignee: Nelson Williams Linings, Inc., Mount Iron, MN (US)

( * ) Notice: Subject to any disclaimer, the term of this patent is extended or adjusted under 35 U.S.C. 154(b) by 0 days.

(21) Appl. No.: 10/640,528

(22) Filed: Aug. 13, 2003

(65) Prior Publication Data

US 2004/0031666 A1 Feb. 19, 2004

Related U.S. Application Data

(60) Provisional application No. 60/403,885, filed on Aug. 16, 2002.

(51) Int. Cl.[7] ............................................. B65C 21/20
(52) U.S. Cl. ................................ 198/836.1; 198/836.3; 198/836.4; 198/860.3
(58) Field of Search ........................... 198/836.1, 836.2, 198/836.3, 836.4, 860.3

(56) References Cited

U.S. PATENT DOCUMENTS

| | | | | |
|---|---|---|---|---|
| 2,156,020 A | * | 4/1939 | Lathrop | 198/836.3 |
| 2,229,605 A | * | 1/1941 | Snyder et al. | 198/836.3 |
| 2,298,472 A | * | 10/1942 | Dudley | 198/525 |
| 3,499,523 A | * | 3/1970 | Clegg | 198/836.1 |
| 4,204,595 A | * | 5/1980 | Marrs | 198/836.1 |
| 4,436,446 A | * | 3/1984 | Gordon | 403/384 |
| 4,641,745 A | * | 2/1987 | Skates | 198/836.1 |
| 4,877,125 A | * | 10/1989 | Gordon | 198/836.1 |
| 5,048,669 A | | 9/1991 | Swinderman | 198/525 |
| 5,154,280 A | * | 10/1992 | Mott | 198/836.1 |
| 5,267,642 A | * | 12/1993 | Gharpurey et al. | 198/836.1 |
| 5,435,669 A | * | 7/1995 | Weber | 414/502 |
| 5,435,689 A | * | 7/1995 | Stonehouse | 414/502 |
| 5,682,976 A | * | 11/1997 | Jorgensen | 198/836.3 |
| 5,774,951 A | * | 7/1998 | Close et al. | 24/568 |
| 6,328,156 B1 | | 12/2001 | Ostman | 198/836.1 |
| 6,543,607 B2 | * | 4/2003 | Fischer et al. | 198/826 |
| 6,547,062 B2 | * | 4/2003 | Wiggins | 198/836.1 |
| 6,557,697 B1 | * | 5/2003 | Bowman | 198/836.3 |
| 6,575,294 B1 | * | 6/2003 | Swinderman et al. | 198/836.1 |

FOREIGN PATENT DOCUMENTS

JP 2003-252419 * 9/2003 .............. 198/836.1

* cited by examiner

Primary Examiner—Douglas Hess
(74) Attorney, Agent, or Firm—Nikolai & Mersereau, P.A.

(57) ABSTRACT

A pivotable wall assembly for retaining material on a conveyor belt allows for the wall to be pivoted down for easy access to the inside surface of the wall. Numerous wall assemblies may be attached end to end in individually pivoted back. The easy access makes it quicker and safer to inspect the inside walls to make adjustments, and to remove or replace the liners, the walls and the conveyor idlers. The easy access reduces the man-hours of labor for inspections, adjustments and liner replacements reducing the cost of conveyor maintenance. The modular construction of the pivotable walls allows easy assembly and disassembly. The pivotable walls can be used with hoppers, or other material handling structures. The top and bottom walls have angled portions for engagement with each other to reduce noise, vibrations and dust resulting in less corrosion and wear on the system.

10 Claims, 3 Drawing Sheets

PIVOTABLE CONVEYOR SKIRT BOARD ASSEMBLY

This application is related to provisional patent application 60/403,885 filed Aug. 16, 2002.

BACKGROUND OF THE INVENTION

1. Field of the Invention

This invention relates to materials handling equipment and more particularly to a pivotable side skirt support assembly for belt conveyors that allows ready access to the skirts, wear plates and conveyor rollers for ease of inspection, maintenance and repair.

2. Description of the Related Art

In Swinderman, U.S. Pat. No. 5,048,669 issued Sep. 17, 1991, the frame must be removed to access the liner. The conveyor must be shut down during this long procedure. Further, adjusting the liner height requires shims which are difficult to install.

Skirts of elastomeric material in use for retaining materials on conveyor belts wear out over time, particularly when abrasive materials are being transported on the conveyor. The skirts have to be readjusted and replaced periodically. Conveyor systems for abrasive materials may also utilize ceramic wear plates on the skirts. If ceramic tiles are used they are subject to replacement over time. Hardened steel wear plates used on the walls also wear out and need replacing or adjustments over time.

The supports for the skirts in prior designs were positioned on either side of the conveyor and difficult to replace or adjust vertically as the skirts wore down. The Ostman U.S. Pat. No. 6,328,156, which is hereby incorporated herein by reference, describes an improved skirt assembly that allows ready adjustment of the elastomeric member as it wears due to frictional contact with a conveyor belt and the material being transported thereon. Replacement of a worn-out liner on a skirt member may require a worker to climb onto the conveyor belt to effect removal. Also a maintenance worker would have to remove the supports for the skirts over the conveyor to access the skirt for inspections, adjustments or replacements.

Further, the conveyor idler wheels used to support the conveyor along its length are generally inaccessible when the supports for the skirts are located directly over the conveyor frame. Therefore adjustments and replacements of the idler wheels often require the removal of the skirt supports.

Depending on their length the skirt support members may be too heavy and may require two men to lift. Removing frame members for inspection, adjustment and maintenance of the conveyor idlers and the skirts is a slow, costly and potentially dangerous process and the conveyor must be shut down while the repairs are being made. The cost for running a conveyor with a skirt is thus unnecessarily high and this is especially true where the support structure for the skirts are welded in a fixed position or if they must be removed to maintain or replace liners, idlers, skirts or other parts.

It is difficult to properly align the frame members when assembling the conveyor structure so that the wear plates and skirts have proper clearances.

SUMMARY OF THE INVENTION

A pivotable frame for supporting skirts, inner liners and wear plates adjacent the opposing sides of conveyor belts allows the frame to be pivoted on the supports while still attached to the conveyor frame and allows a single worker to tilt the frame and access the conveyor idlers and the skirt and/or wear plates for inspection, adjustments, and maintenance or replacement of parts.

The frame when tilted for access forms a table for setting the liners, tools, parts and supplies thereon.

Since no disassembly and reassembly of the frame is required the costs of operating the system are reduced and the down time is likewise reduced. Further, since one man can tilt the frame down the number of laborers is reduced, and since no heavy parts need to be handled or removed injuries are avoided.

The skirts or liners are easily adjusted vertically by moving the skirt relative to its supporting bracket or by vertically moving the bracket itself.

Since the top and bottom walls of the conveyor assembly are modular and easy to assemble and disassemble it is easier to construct and remove the conveyor assembly.

Bushings on the pivotable walls ensure proper alignment of the pivotable walls so that the liners and skirts are in the proper position and there is less wear on the apertures of the pivotable walls.

OBJECTS OF THE INVENTION

It is an object of the invention to reduce the costs of maintaining and replacing side skirts, liners and ceramic tiles used with conveyor belts for transporting abrasive bulk materials.

It is an object of the invention to increase the safely of maintaining a conveyor belt skirt system of the type described.

It is an object of the invention to provide ready access to the inner wear liners and the rubber skirt member for inspection, adjustments, maintenance and replacement of parts.

It is an object of the invention to provide a conveyor side skirt assembly that allows ready access to the conveyor idler rollers for inspection, maintenance adjustments and replacement of parts.

It is an object of the invention to eliminate the need to remove the frame holding the skirts on the conveyor to gain access the inner wear liner, ceramic plates, skirt and conveyor idler wheels.

It is an object of the invention to provide a construction that allows adjustment of the vertical position of the liner and skirt on the skirt support bracket more easily.

It is an object of the invention to adjust the vertical position of the lower wall easily.

It is an object of the invention to provide a conveyor belt side skirt assembly that dampens noise and dust.

It is an object of the invention to improve safety.

It is an object of the invention to make it easier to assemble and disassemble a conveyor system.

It is an object of the invention to reduce dust and corrosion to increase the life of the conveyor system.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
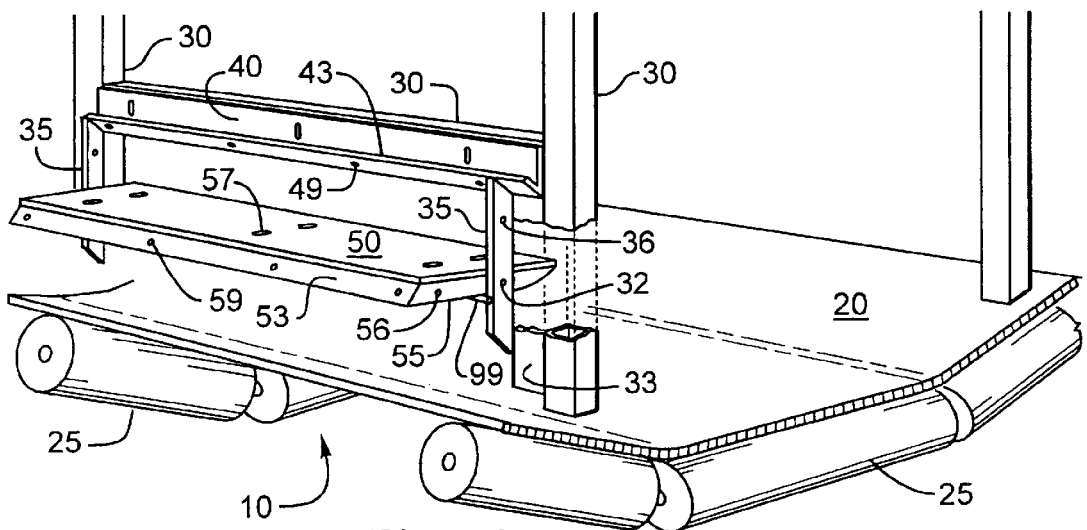
FIG. 1 is a perspective view of a portion of a conveyor having the pivotable conveyor skirt board of the present invention, in the open position.

FIG. 1 shows a perspective view of a portion of a conveyor belt 20 used for transporting bulk materials thereon in conjunction with the pivotable conveyor skirt board assembly 10 of the present invention. The pivotable conveyor skirt board assembly 10 is shown along the sides of the conveyor belt 20 without a structure on top of the frame. It is to be understood, however, that a hopper or other structure may use the pivotable conveyor skirt board assembly 10.

The frame member of the conveyor structure 30 supports a frame side plate 33 having a flange portion 35 with a pivot aperture 32 and a locking aperture, 36 and an angled portion 37.

Figure 2:
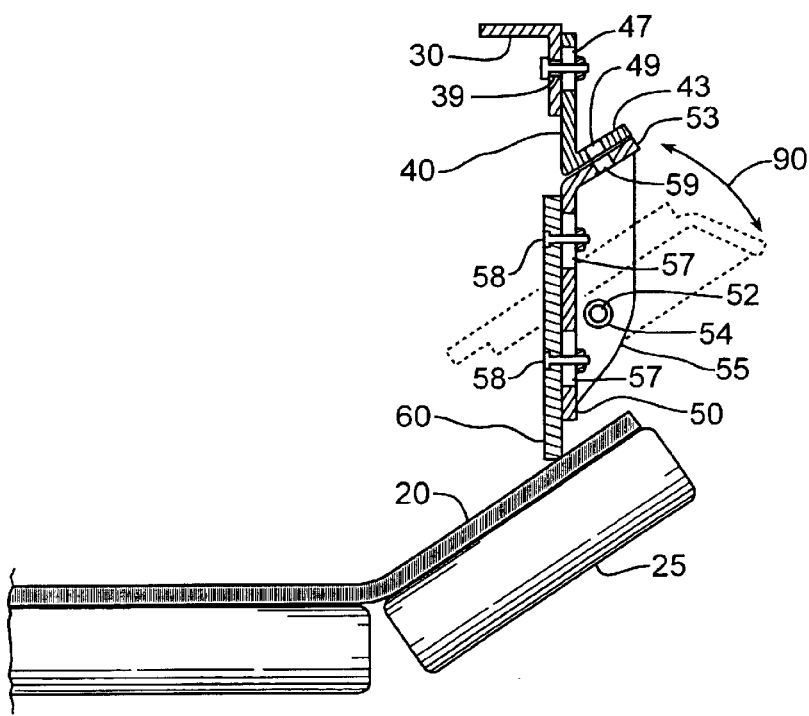
FIG. 2 is view of a first embodiment of the pivotable conveyor skirt board.
Figure 3:
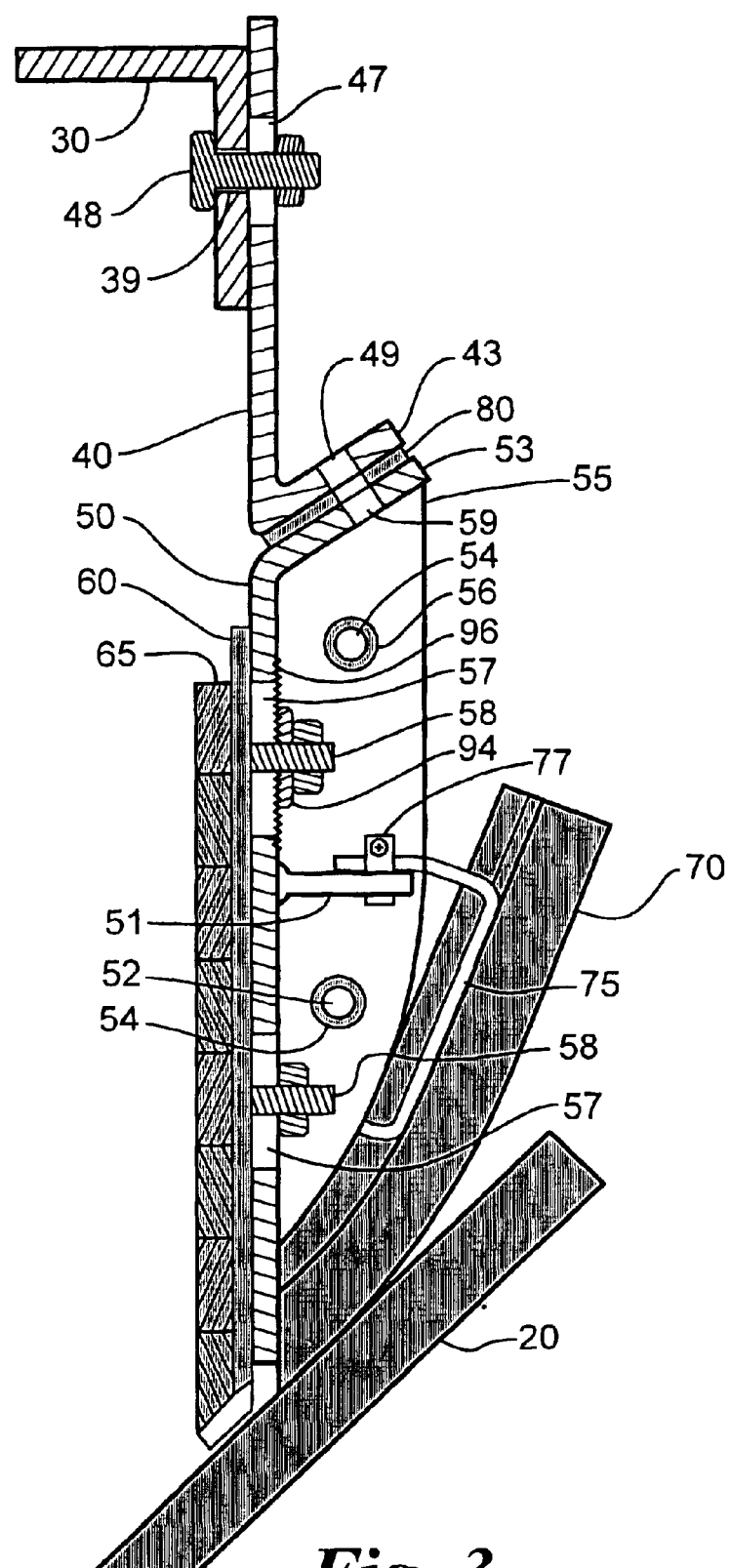
FIG. 3 is an end view of a second embodiment of the pivotable conveyor skirt board.

As best seen in FIGS. 2 and 3 an elongated top wall 40 which may be about five to ten feet in length is attached to the frame 30 and frame side plate 33. The top wall 40 has an angled portion 43 which preferably is angled upward at about 30 degrees to the normal. However any other appropriate angle may be used. The top wall 40 is adjustably mounted on frame 30 by use of a vertical adjustment slot 47 in conjunction with a bolt 48 which passes through aperture 39 in frame 30. The bolt 48 can be loosened to adjust the vertical position of the top wall 40.

Bottom wall 50 having a flange 55 is pivotably attached to the frame side plate flange 35 at pivot aperture 32 by use of a bushing 54 and pivot aperture 52 on the bottom wall flange 55 allowing the bottom wall 50 to pivot in directions 90 as shown in FIG. 2. The bottom wall 50 has an angled portion 53 which is angled upward at a complementary angle to the angled portion 43 of the top wall 53 such that they sealingly engage when the bottom wall is in the vertical position. As shown in FIG. 3, a rubber seal 80 may be used, between the angled portions 43 and 53 of the top and bottom walls 40 and 50 respectively to dampen vibrations and noise, and reduce dust or other emissions from between the top and bottom walls 40 and 50. Reducing dust and other particles can reduce wear and corrosion on the conveyor system resulting in a longer life and less maintenance. Apertures 49 and 59 in the angled portions 43 and 53 of the top and bottom walls 40 and 50 may be used as a means of securing the two walls together by means of a bolt or other fastener passing therethrough.

Figure 4:
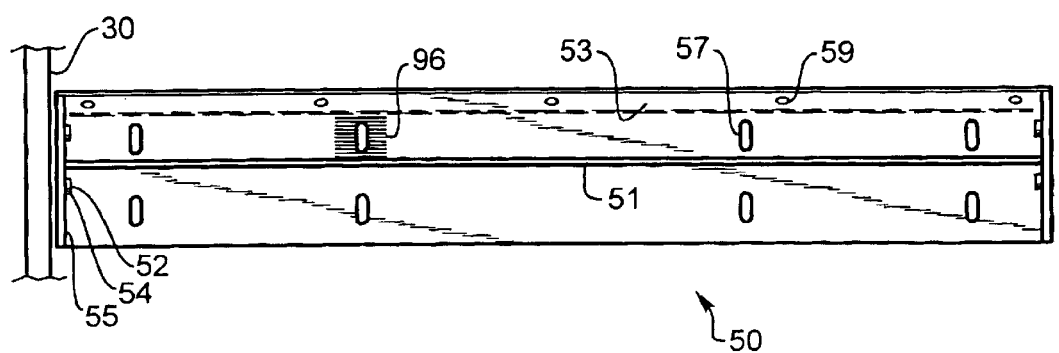
FIG. 4 is a front view of the bottom wall of the pivotable conveyor skirt board.
Figure 5:
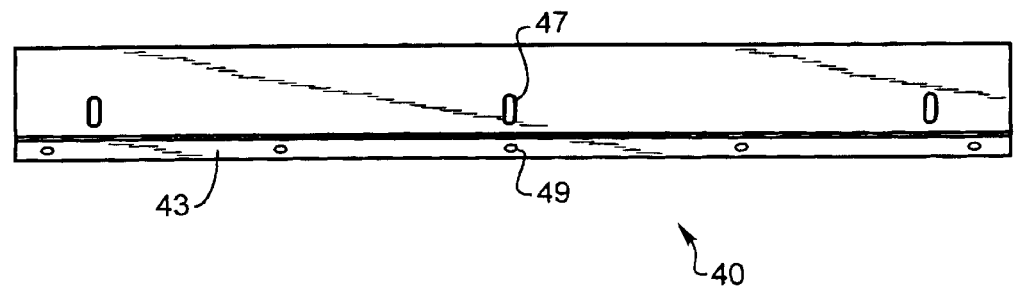
FIG. 5 is a front view of the top wall of the pivotable conveyor skirt board.

The bottom wall 50 may also have an aperture 56 (FIG. 3) for lockingly securing the bottom wall 50 to the frame 30 by means of a safety lock, bolt or other fastener passing through aperture 36 in the frame side plate flange 35. In this manner the pivotable wall 50 may be secured in the vertical position on the frame 30. As shown in FIGS. 3 and 4 serrated grooves 96 in the bottom wall 50 engage serrated grooves 92 on serrated washer 94 to lock the liner 60 in position, which prevents the liner 60 from lowering onto conveyor belt 20 due to vibrations or impacts.

When the bottom wall 50 is pivoted downward it may rest in a horizontal position by engaging stop bars 99 on the flange such that the bottom wall rests above conveyor belt 20 forming a horizontal shelf surface making it convenient to work on. Because, when horizontal, the bottom wall 50 is spaced from the conveyor belt 20, adjustment or replacement of worn idlers 25 is facilitated. Moreover, inspecting, adjusting or replacing the wear liner 60 or ceramic plates 65 on the inside of the bottom wall 50 is facilitated. It is also easier to place the wear liners 60 on the bottom wall 50 and attach them when the bottom wall 50 is flat since the wear liners 60 are heavy. It is also easier to attach the ceramic plates 65 to the wear liners 60 when the bottom wall 50 is in the horizontal position. It is much easier to work on the wear liners 60 and ceramic plates 65 and for inspecting, attaching, and adjusting them then they are horizontal on the horizontal bottom wall 50.

The bottom wall 50 has vertical adjustment slots 57 used in conjunction with bolts 58 on wear liner 60 to adjust the position of the wear liner 60 and optionally the ceramic tiles 65 such that they may be aligned into place to reduce vibration and wear thus increasing durability. The liners 60 and ceramic tiles 65 should be periodically inspected and adjusted for optimum performance of the conveyor system.

As shown in FIG. 3 an elastomeric skirt 70 can be attached to the bottom wall 50 in a manner described in the aforementioned Ostman patent. In this embodiment a welded flange 51 extends from the bottom wall and a skirt support 75 is attached to the flange 51 by a connector 77. The connector 77 releasably fastens the skirt support 75 to flange 51.

The wear liner 60 may be an elastomeric material preferably a reinforced rubber.

When ceramic plates 65 are used, they may be attached to a fiberglass or other backing instead the rubber wear liner 60.

The modular assembly of the top and bottom walls 40 and 50 allows for easy assembly and disassembly of the conveyor system.

Obviously, many modifications and variations of the present invention are possible in light of the above teachings. It is therefore to be understood that, within the scope of the appended claims, the invention may be practiced otherwise than as specifically described.

What is claimed is:

1. A pivotable conveyor skirt board assembly comprising,
a plurality of frame members supported above a conveyor belt,
a top wall attached to the frame members, the top wall running parallel to the edge of the conveyor belt,
a frame side plate attached to the frame members, the frame side plate having a flange portion with a pivot aperture,
a bottom wall having a flange at either end, the bottom wall flanges pivotally attached to the flanges of two adjacent frame side plates such that the bottom wall engages the top wall when pivoted upright and pivots to an open position when desired,
a liner adjustably attached to the bottom wall such that the liner position can be adjusted on the bottom wall relative to the position of the underlying conveyor belt.

2. A pivotable conveyor skirt board assembly as in claim 1 having,
a flange angled on the top of the bottom wall and a flange correspondingly angled on the bottom of the top wall such that the flanges mate in parallel position when the bottom wall is pivoted upright.

3. A pivotable conveyor skirt board assembly as in claim 2 having, an aperture in the flange on the top wall and an aperture in the flange on the bottom wall opposite the flange on the top wall such that a locking mechanism can pass through the apertures and lock the top wall and the bottom wall in a closed position.

4. A pivotable conveyor skirt board assembly as in claim 2 having, a gasket between the flanges on the top wall and the bottom wall to ensure a good seal therebetween to prevent dust from escaping from the conveyor area, and to dampen vibrations between the two flanges.

5. A pivotable conveyor skirt board assembly as in claim 1 wherein, the liner has a ceramic material for engaging matter on the conveyor belt for long wear of the liner.

6. A pivotable conveyor skirt board assembly as in claim 5 wherein, the liner has an elastomeric material.

7. A pivotable conveyor skirt board assembly as in claim 1 wherein, an elastomeric skirt attached to the bottom wall extends between the bottom wall and the conveyor belt to prevent dust and other particles from escaping from the conveyor belt.

8. A pivotable conveyor skirt board assembly as in claim 1 wherein, an aperture in the frame side plate flange and an aperture in the bottom wall flange which align to allow a locking mechanism to pass therethrough when the bottom wall is upright.

9. A pivotable conveyor skirt board assembly as in claim 1 wherein, a stop bar on the frame side plate flange engages the bottom wall when pivoted perpendicularly to the frame side plate such that it holds the bottom wall horizontally for ease of work thereon.

10. A pivotable conveyor skirt board assembly as in claim 1 wherein, the top wall is adjustably attached to the frame to adjust the height of the bottom wall relative the conveyor belt.

* * * * *

UNITED STATES PATENT AND TRADEMARK OFFICE
CERTIFICATE OF CORRECTION

PATENT NO. : 6,763,935 B2
DATED : July 20, 2004
INVENTOR(S) : Arthur C. Ostman

It is certified that error appears in the above-identified patent and that said Letters Patent is hereby corrected as shown below:

Title page,
Item [75], Inventor, change "Mount" to -- Mountain --.
Item [73], Assignee, change "Mount" to -- Mountain --, and add -- Arthur C. Ostman, Mountain Iron, MN (US) --.

Signed and Sealed this

Fifteenth Day of November, 2005

JON W. DUDAS
*Director of the United States Patent and Trademark Office*